(12) United States Patent
Kato et al.

(10) Patent No.: US 7,522,894 B2
(45) Date of Patent: Apr. 21, 2009

(54) RADIO RECEIVING APPARATUS

(75) Inventors: Akira Kato, Takatsuki (JP); Takashi Kawabata, Kusatsu (JP)

(73) Assignee: Murata Manufacturing Co., Ltd., Kyoto (JP)

( * ) Notice: Subject to any disclaimer, the term of this patent is extended or adjusted under 35 U.S.C. 154(b) by 777 days.

(21) Appl. No.: 10/752,546

(22) Filed: Jan. 8, 2004

(65) Prior Publication Data

US 2004/0198238 A1    Oct. 7, 2004

(30) Foreign Application Priority Data

Apr. 3, 2003    (JP) .............................. 2003-100531

(51) Int. Cl.
*H04B 1/04* (2006.01)

(52) U.S. Cl. ....................... 455/131; 455/132; 455/137; 455/273; 455/242.2; 455/101; 333/133; 333/195; 333/193; 310/313 B; 310/313 A; 310/313 R (58) Field of Classification Search ................. 455/131, 455/132, 137, 273, 242.1, 101, 82, 277.1, 455/85, 84, 242.2; 310/313 B, 313 D; 333/193, 333/133

See application file for complete search history.

(56) References Cited

U.S. PATENT DOCUMENTS

| | | | | |
|---|---|---|---|---|
| 4,512,034 A | * | 4/1985 | Greenstein et al. | 455/139 |
| 4,636,736 A | * | 1/1987 | Woodworth et al. | 329/346 |
| 4,715,048 A | * | 12/1987 | Masamura | 375/347 |
| 5,051,709 A | * | 9/1991 | Birkett et al. | 333/28 R |
| 5,068,668 A | * | 11/1991 | Tsuda et al. | 342/362 |
| 5,122,767 A | * | 6/1992 | Cameron et al. | 333/154 |
| 5,170,500 A | * | 12/1992 | Broderick | 455/315 |
| 5,203,023 A | * | 4/1993 | Saito et al. | 455/133 |
| 5,397,409 A | | 3/1995 | Kornylo | |
| 5,826,179 A | * | 10/1998 | Lindenmeier et al. | 455/277.2 |
| 6,064,865 A | * | 5/2000 | Kuo et al. | 455/135 |
| 6,091,788 A | * | 7/2000 | Keskitalo et al. | 375/347 |
| 6,104,260 A | * | 8/2000 | Yamada et al. | 333/193 |
| 6,151,481 A | * | 11/2000 | Wilson et al. | 455/13.3 |

(Continued)

FOREIGN PATENT DOCUMENTS

JP    2002-026785    1/2002

(Continued)

OTHER PUBLICATIONS

Official communication issued in the counterpart Japanese Application No. 2003-100531, mailed on Oct. 2, 2007.

*Primary Examiner*—Marceau Milord
(74) *Attorney, Agent, or Firm*—Keating & Bennett, LLP (57) ABSTRACT

A radio receiving apparatus includes two receiving antennas, two upstream RF amplifiers, a SAW filter having two input IDTs and an output IDT, a downstream RF amplifier, and a detector circuit. The antennas are connected to the respective input IDTs via the respective upstream RF amplifiers. The detector circuit is connected via the downstream RF amplifier to the output IDT, which receives a signal from each of the two input IDTs. The distances from the center of the output IDT to the centers of the input IDTs differ from one another. The SAW filter functions as two band-pass filters, two delay circuits connected to the respective band-pass filters, and a combiner circuit for combining the outputs from the delay circuits.

25 Claims, 6 Drawing Sheets

U.S. PATENT DOCUMENTS

| | | | | |
|---|---|---|---|---|
| 6,339,704 | B1 * | 1/2002 | Furukawa | 455/313 |
| 6,415,163 | B1 * | 7/2002 | Keskitalo et al. | 455/562.1 |
| 6,430,404 | B1 * | 8/2002 | Lindenmeier et al. | 455/132 |
| 6,449,469 | B1 * | 9/2002 | Miyahara | 455/273 |
| 6,459,345 | B1 * | 10/2002 | Kosinski et al. | 333/166 |
| 6,571,090 | B1 * | 5/2003 | Moriyama et al. | 455/277.1 |
| 6,807,223 | B2 * | 10/2004 | Katz et al. | 375/149 |
| 6,853,694 | B1 * | 2/2005 | Beaudin et al. | 375/347 |
| 6,907,272 | B2 * | 6/2005 | Roy | 455/562.1 |
| 6,922,549 | B2 * | 7/2005 | Lyons et al. | 455/67.13 |
| 6,937,113 | B2 * | 8/2005 | Ohashi et al. | 333/133 |
| 6,937,677 | B2 * | 8/2005 | Strolle et al. | 375/347 |
| 6,943,645 | B2 * | 9/2005 | Taniguchi | 333/133 |
| 6,970,523 | B2 * | 11/2005 | Strolle et al. | 375/345 |
| 7,016,660 | B2 * | 3/2006 | Meijer et al. | 455/277.2 |
| 7,085,530 | B2 * | 8/2006 | Weissman | 455/7 |
| 7,106,809 | B2 * | 9/2006 | Whikehart et al. | 375/316 |
| 7,194,241 | B2 * | 3/2007 | Schmitz et al. | 455/83 |
| 7,212,796 | B2 * | 5/2007 | Okanobu | 455/234.1 |
| 7,233,810 | B2 * | 6/2007 | Medlock et al. | 455/560 |

FOREIGN PATENT DOCUMENTS

JP   2002-152097   5/2002

* cited by examiner

RADIO RECEIVING APPARATUS

BACKGROUND OF THE INVENTION

1. Field of the Invention

The present invention relates to a radio receiving apparatus for use in, for example, a remote keyless entry (abbreviated to RKE in some cases) system which is intended to successfully receive, at least once, a single radio signal which is transmitted several times at predetermined intervals.

2. Description of the Related Art

A typical radio receiving apparatus, such as those adopting the diversity system, uses two or more antennas for successful reception of a signal. A radio receiving apparatus which uses two or more antennas carries out diversity switching for selecting a signal received with the best conditions from among those signals received by the respective antennas. This diversity switching, however, may require two or more detector circuits and a select switch, leading to a complicated and large circuit of the radio receiving apparatus, which thus becomes expensive. To address this problem, Japanese Unexamined Patent Applications Publication Nos. 2002-26785 and 2002-152097 disclose a system where diversity switching is not carried out despite the fact that two or more antennas are used.

In the system disclosed in Publication No. 2002-26785, two CDMA RF signals received by the respective antennas are converted to respective IF signals. One of the IF signals is delayed and then combined with the other IF signal. These combined signals are demodulated thereafter.

In the system disclosed in Publication No. 2002-152097, two CDMA RF signals received by the respective antennas are converted to respective IF signals, which are both delayed through a SAW filter and then combined with each other. These combined signals are demodulated thereafter.

Advantageously, neither of the systems disclosed in Publication Nos. 2002-26785 and 2002-152097 perform diversity switching, contributing to a less expensive radio receiving apparatus with fewer components.

No literature is available which introduces a radio receiving apparatus that neither uses the CDMA system nor carries out diversity switching. Furthermore, there is no known literature which discloses an RKE receiver using the diversity system.

The systems disclosed in Publication Nos. 2002-26785 and 2002-152097 are based on a feature of the CDMA system, namely, the capability of decoding (decrypting) signals which time-overlap or frequency-overlap each other. For this reason, it is difficult to apply the disclosed systems to radio receiving apparatuses which use FSK modulation and ASK modulation, such as RKE receivers.

Furthermore, diversity switching, which readily causes the receiving apparatus adopting it to become large for the reasons described above, is not suitable for a radio receiving apparatus, such as an RKE receiver, whose function is so simple as to handle only a small amount of communication information and which therefore must be inexpensive.

SUMMARY OF THE INVENTION

In order to overcome the problems described above, preferred embodiments of the present invention provide an inexpensive radio receiving apparatus which has a simple and small circuit despite the fact that a plurality of receiving antennas are used.

According to a preferred embodiment of the present invention, a radio receiving apparatus includes a plurality of antennas, a plurality of delay circuits which are respectively connected to the antennas and have delay times that are different from one another, a combiner circuit for combining reception signals output from the delay circuits such that the reception signals do not overlap one another in the time domain, and a detector circuit for sequentially detecting the reception signals output from the combiner circuit.

A signal received by the antennas may be a burst signal having a constant duration and the delay times of the delay circuits differ from one another by at least the duration of the burst signal.

The burst signal may be repeated at a constant interval and the delay time of the delay circuit having the largest delay time is smaller than the interval.

The radio receiving apparatus may further include a frequency converter circuit between each of the antennas and the corresponding delay circuit.

The radio receiving apparatus may further include a band-pass filter connected in series to each of the delay circuits.

The delay circuits, the band-pass filters, and the combiner circuit may constitute a surface acoustic wave device which includes a plurality of input IDTs connected to the respective antennas and an output IDT for receiving signals from the input IDTs such that the distances from the center of the output IDT to the centers of the input IDTs differ from one another.

The radio receiving apparatus described above advantageously has a small circuit despite the fact that a plurality of receiving antennas are used, and exhibits a greatly increased likelihood of a signal being successfully received. Furthermore, the surface acoustic wave device functioning as band-pass filters for simultaneously input signals contribute to a reduction in the number of components of the radio receiving apparatus.

Other features, elements, characteristics and advantages of the present invention will become more apparent form the following detailed description of preferred embodiments with reference to the attached drawings.

DETAILED DESCRIPTION OF PREFERRED EMBODIMENTS

Figure 1:
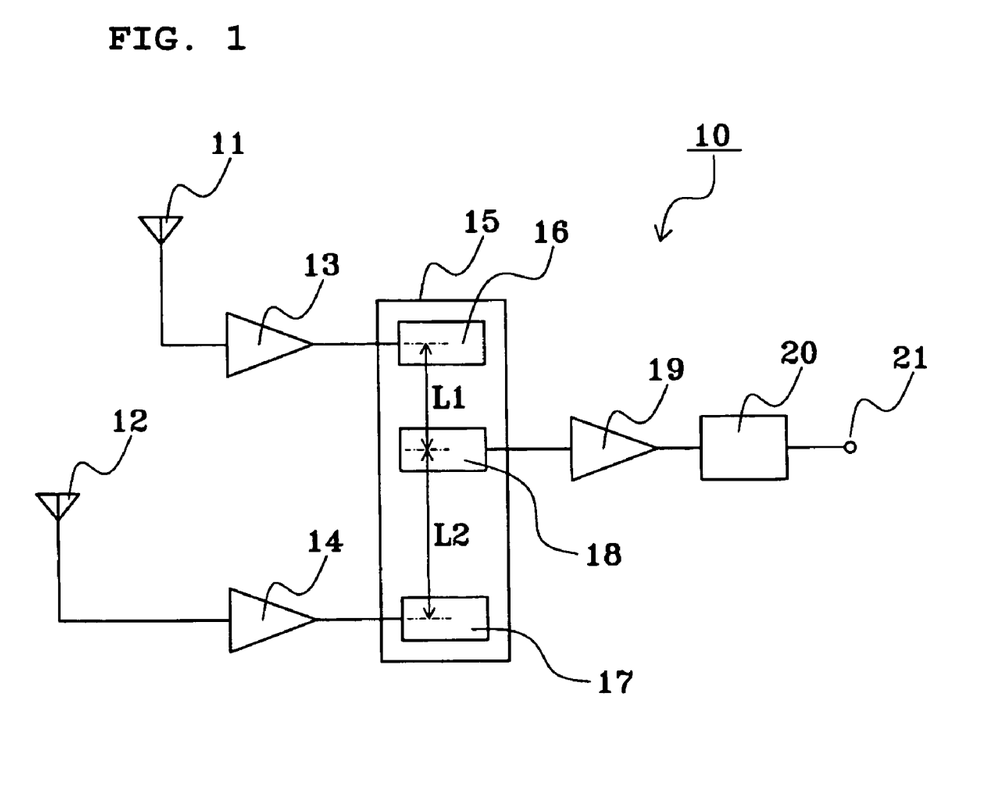
FIG. 1 is a block diagram of a radio receiving apparatus according to a first preferred embodiment of the present invention.

FIG. 1 is a block diagram of a radio receiving apparatus according to a first preferred embodiment of the present invention. A radio receiving apparatus 10 represents an RKE receiver which preferably includes two antennas 11 and 12, three RF amplifiers 13, 14, and 19, a SAW filter 15 as a surface acoustic wave device, a detector circuit 20, and an output terminal 21. The SAW filter 15 includes three inter-digital transducers (abbreviated to IDTs) 16, 17, and 18 arranged in the propagation direction of a surface acoustic wave. The IDTs 16 and 17 are input IDTs and the IDT 18 is an output IDT. The IDT 18 is disposed between the IDTs 16 and 17. A clearance L1 between the IDT 16 and the IDT 18 and a clearance L2 between the IDT 17 and the IDT 18 differ from each other. This design allows one band-pass filter (may be abbreviated to BPF) to be formed between the IDTs 16 and 18 and another BPF to be formed between the IDTs 17 and 18 such that both the BPFs have substantially identical characteristics and have delay times different from each other by the difference between the clearances L1 and L2. The difference T2 between the delay times of the BPFs (as shown in FIG. 2) is defined as "(L2-L1)/acoustic velocity of surface acoustic wave".

The antenna 11 is connected to the IDT 16 via the RF amplifier 13, and the antenna 12 is connected to the IDT 17 via the RF amplifier 14. The IDT 18 is connected to the detector circuit 20 via the RF amplifier 19, and thus the output from the IDT 18 is passed to the output terminal 21.

How a signal received by the radio receiving apparatus 10 travels is now described. In general, what is required for an RKE system is to deliver only simple information such as whether to lock/unlock a vehicle door or open/close a vehicle window, and start the engine in some cases. For this simple purpose, FSK modulation or ASK modulation is applied to an RF signal of several hundred MHz by using a digital signal including simple information. Furthermore, the signal thus modulated is transmitted to the radio receiving apparatus 10 several times at predetermined intervals (an interval T1 as shown in FIG. 2) to ensure that the radio receiving apparatus 10 receives the signal successfully. The signal received several times by the antenna 11 of the radio receiving apparatus 10 appears as shown in the topmost time-varying waveform of FIG. 2, that is, a series of burst signal components. It is noted that the waveforms in FIG. 2 are expressed faithfully in terms of amplitude only, and the effect of modulation is not reflected on the waveforms.

Figure 2:
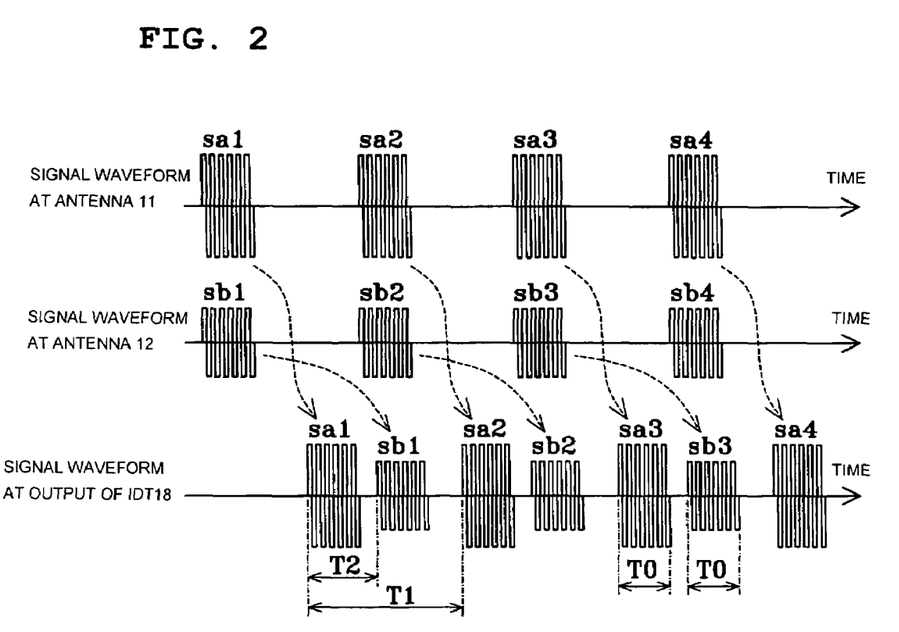
FIG. 2 shows the time-varying waveforms of signal components at some portions of the radio receiving apparatus shown in FIG. 1.

FIG. 2 also shows the waveforms of the signal as received at the antenna 12 and as output from the IDT18 of the radio receiving apparatus 10. In FIG. 2, a first signal sx1, a second signal sx2, a third signal sx3, and a fourth signal sx4, each having a duration T0, are received at the antennas 11 and 12, where the character x is a if the signal is received at the antenna 11 or b if the signal is received at the antenna 12. The signals sx1, sx2, sx3, and sx4 include the same information which is modulated with the same digital signal, and are transmitted one after another at the constant interval T1.

The radio receiving apparatus 10 receives a first signal at the two antennas 11 and 12. In this situation, the two antennas 11 and 12 may be mounted at two positions on a vehicle body about 1 m to about 2 m away from each other. Although the two antennas 11 and 12 may receive the first signal at substantially the same time, the amplitude of the signal at the antenna 11 may differ from that at the antenna 12 because the signal is attenuated by an object between the transmitter and the antennas 11 and 12. In more detail, each pair of counterpart signal components, such as the signal components sa1 and sb1, is received at substantially the same time, as shown in FIG. 2. Furthermore, the signal components received at the antenna 12, such as the signal component sb1, have a lower amplitude than the counterpart signal components received at the antenna 11, such as the signal component sa1.

A signal component received at the antenna 11, such as the signal component sa1, is amplified in the RF amplifier 13 and then input to the IDT 16 of the SAW filter 15. The signal component which has been input to the IDT 16 is converted to a surface acoustic wave and passed to the IDT 18, which then converts the surface acoustic wave to an electrical signal, which is input to the RF amplifier 19. On the other hand, a signal component received at the antenna 12, such as the signal component sb1, is amplified in the RF amplifier 14 and is then input to the IDT 17 of the SAW filter 15. The signal component which has been input to the IDT 17 is converted to a surface acoustic wave and passed to the IDT 18, which then converts the surface acoustic wave to an electrical signal, which is input to the RF amplifier 19.

As described above, the SAW filter 15 includes two filters with delay times that are different from each other. The signal component sb1 thus output from the IDT 18 is delayed by the delay time difference T2 from the signal component sa1. This delay time difference T2 is larger than the duration T0, as shown in FIG. 2, to prevent the signal component sa1 from overlapping the signal component sb1 along the time axis, i.e., in the time domain. On the other hand, the signal component sa2 passes through IDT 17 to the IDT 18, the interval T1 after the signal component sa1 has passed though the IDT 16 to the IDT 18. To prevent the signal component sa2 from time-overlapping the signal component sb1, the interval T1 is made larger than the sum of the delay time difference T2 and the duration T0. This approach allows the IDT 18 to output the signal components sa1, sb1, sa2, sb2, and so on, such that these signal components do not overlap one another along the time axis. Thus, the SAW filter 15 can be regarded as including two band-pass filters, two delay circuits having delay times that are different from each other and respectively connected to the band-pass filters, and a combiner circuit for combining the two outputs from the delay circuits.

A sequence of the signal components output from the IDT 18 is amplified in the RF amplifier 19, wave-detected sequentially in the detector circuit 20, and output from the output terminal 21. As described above, the signal components sa1, sb1, sa2, sb2, and so on include the same information. The minimum requirement for the radio receiving apparatus 10 is therefore to allow the detector circuit 20 to detect at least one of these signal components. Even if the amplitudes of the signal components sb1, sb2, and so on are too low to allow wave detection, one of the signal components sa1, sa2, and so on is likely to be detected. In contrast, if the signal components sa1, sa2, and so on have a sufficiently high amplitude but include too much noise to allow wave detection, one of the signal components sb1, sb2, and so on may be detected.

As described above, the radio receiving apparatus 10 according to preferred embodiments of the present invention has a diversity function for receiving a signal at a highly successful rate by capturing at least one of the two signals received at the two antennas 11 and 12. Furthermore, the SAW filter 15 includes the band-pass filter function (a separate band-pass filter is required in typical radio receiving apparatuses). Because of this feature, the units required as a pair are the antenna and the RF amplifier only. Thus, the circuit of the radio receiving apparatus 10 according to preferred embodiments of the present invention can be designed to be compact.

Figure 3:
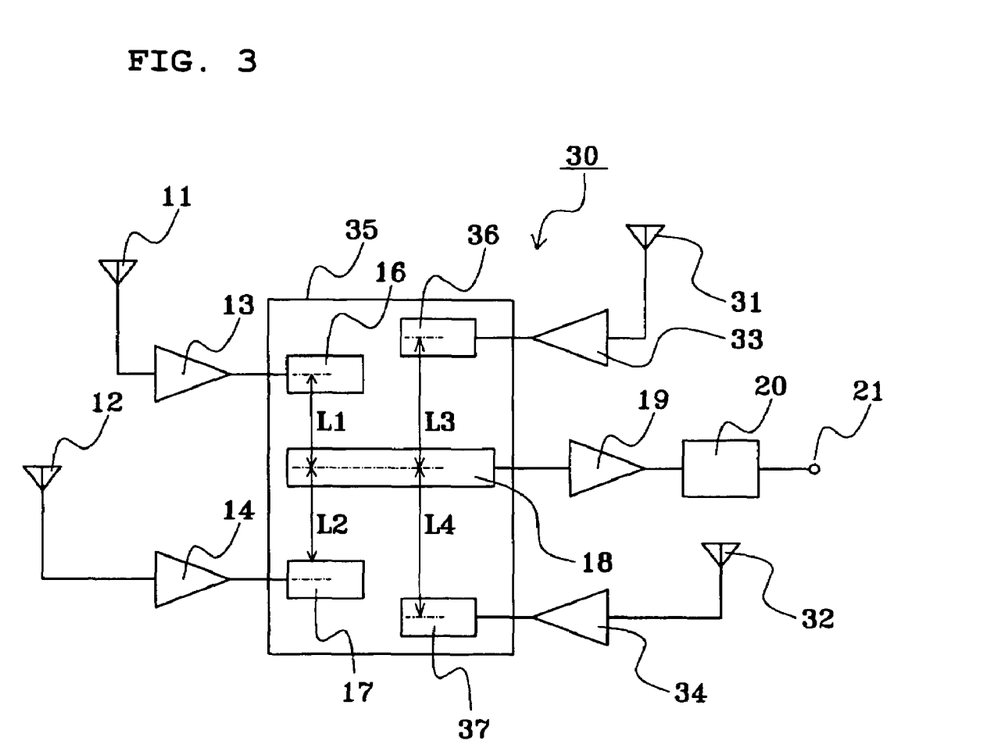
FIG. 3 is a block diagram of a radio receiving apparatus according to a second preferred embodiment of the present invention.

FIG. 3 is a block diagram of a radio receiving apparatus according to a second preferred embodiment of the present invention. The reference numerals and symbols in FIG. 3 refer to the same components as those with the same reference numerals and symbols in FIG. 1, and repeated descriptions of the same components are omitted.

A radio receiving apparatus 30 uses a SAW filter 35 as a surface acoustic wave device, instead of the SAW filter 15 in the radio receiving apparatus 10. The SAW filter 35 includes five IDTs 16, 17, 18, 36, and 37. The IDT 18 is disposed in the direction in which surface acoustic waves from the IDTs 16, 17, 36, and 37 propagate. The IDTs 36 and 37 are input IDTs. The IDTs 16 and 17 are disposed with respect to the IDT 18 in the same manner as for the SAW filter 15; in short, the relationship between the clearances L1 and L2 is the same as for the SAW filter 15. In the SAW filter 35, a clearance L3 (between the IDTs 36 and 18) and a clearance L4 (between the IDTs 37 18) differ not only from each other but also from the clearances L1 and L2. Thereby, the segment between the IDTs 36 and 18 functions as one band-pass filter, and the segment between the IDTs 37 and 18 functions as another band-pass filter such that both the band-pass filters have substantially the same characteristics and have delay times different from each other by the difference between the clearances L3 and L4.

The radio receiving apparatus 30 including the SAW filter 35 is additionally provided with two antennas 31 and 32 and two RF amplifiers 33 and 34 in accordance with the IDTs 36 and 37 added. The antenna 31 is connected to the IDT 36 via the RF amplifier 33, whereas the antenna 32 is connected to the IDT 37 via the RF amplifier 34. The antennas 31 and 32, like the antennas 11 and 12, are assumed to be mounted at two positions on the vehicle body about 1 m to about 2 m away from each other.

Figure 4:
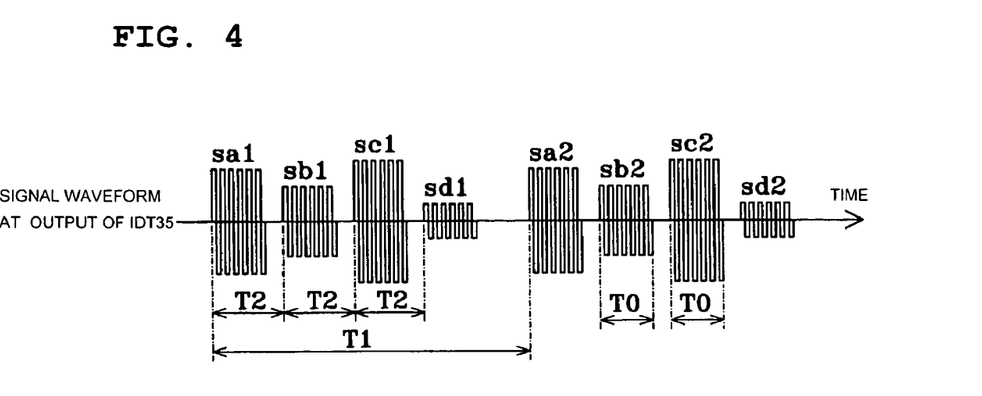
FIG. 4 shows the time-varying waveform of a signal component output from a SAW filter of the radio receiving apparatus shown in FIG. 3.

The radio receiving apparatus 30 having the above-described structure includes the four antennas 11, 12, 31, and 32 in total, which receive respective signal components of a single signal at substantially the same time. The signal components received respectively at the four antennas 11, 12, 31, and 32 are combined at the SAW filter 35. In other words, this SAW filter 35 functions as band-pass filters with delay times that are different from each other; as delay circuits; and also as a combiner circuit. The waveform of a signal component output from the IDT 18 in the SAW filter 35 is as shown in FIG. 4. Unlike FIG. 2, FIG. 4 does not include the waveforms of signal components received at the antennas 11, 12, 31, and 32.

The signal components sa1 and sa2 are received at the antenna 11, the signal components sb1 and sb2 are received at the antenna 12, the signal components sc1 and sc2 are received at the antenna 31, and the signal components sd1 and sd2 are received at the antenna 32. The signal components each have a duration T0. There is an interval T2 from the signal components sa1 to sb1, from the signal components sb1 to sc1, and from the signal components sc1 to sd1. In short, the delay time from one delay circuit to another is the interval T2. The signal component sa1 is followed by the signal component sa2 at the interval T1. The relationship among the duration T0, interval T1, and delay time difference T2 is expressed as follows:

$$T2 > T0,$$

$$T1 > (n-1)T2 + T0$$

where n is the number of antennas.

As described above, the radio receiving apparatus 30 preferably includes the SAW filter 35, the four antennas 11, 12, 31, and 32, and the four RF amplifiers 13, 14, 33, and 34. This design allows one transmitted signal to be received as four signal components at the respective antennas. These signal components also include the same information, and hence the minimum requirement for the radio receiving apparatus 30 is to allow the detector circuit 20 to detect at least one of these signal components.

As described above, the radio receiving apparatus 30 advantageously has a diversity function for receiving a signal at a highly successful rate, while still preventing the circuit from becoming large.

Figure 5:
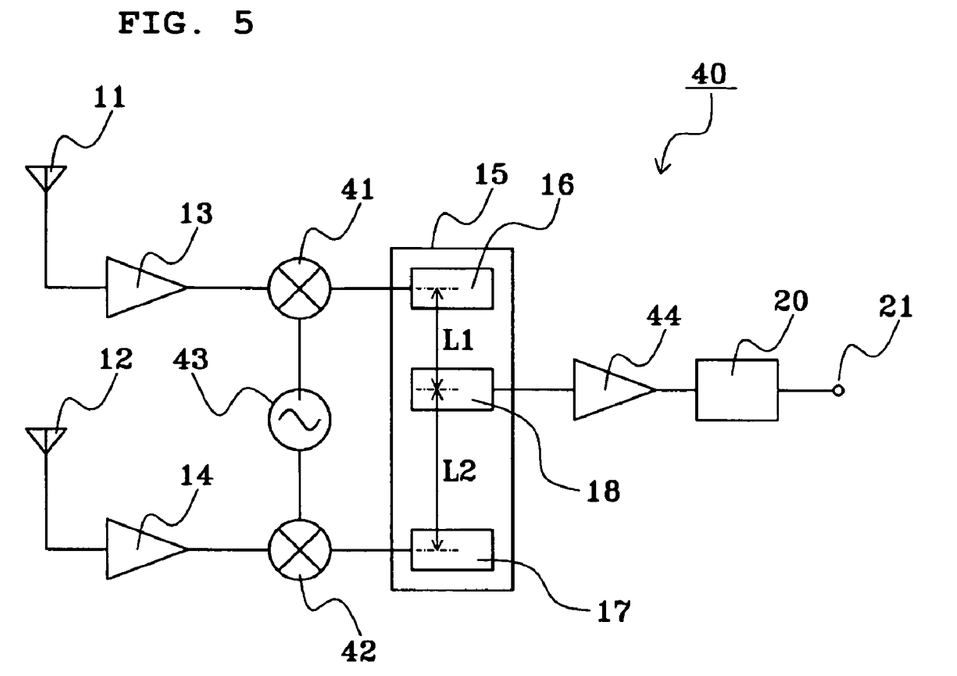
FIG. 5 is a block diagram of a radio receiving apparatus according to a third preferred embodiment of the present invention.

FIG. 5 is a block diagram of a radio receiving apparatus according to a third preferred embodiment of the present invention. The reference numerals and symbols in FIG. 5 refer to the same components as those with the same reference numerals and symbols in FIG. 1, and repeated descriptions of the same components are omitted.

A radio receiving apparatus 40 shown in FIG. 5 differs from the radio receiving apparatus 10 in FIG. 1 in that the apparatus 40 has a mixer 41 for converting a signal output from the RF amplifier 13 to an IF signal and inputting it to the SAW filter 15, a mixer 42 for converting a signal output from the RF amplifier 14 to an IF signal and inputting it to the SAW filter 15, a local oscillator 43 for generating a local oscillating signal to be input to the mixers 41 and 42, and an IF amplifier 44 instead of the RF amplifier 19.

As described above, the radio receiving apparatus 40 includes a function for converting an RF signal to an IF signal, accordingly allowing the circuit section subsequent to the SAW filter 15 to handle an IF signal. The radio receiving apparatus 40 can offer the same advantage as the radio receiving apparatus 10. That is, the circuit can be prevented from becoming large despite using the diversity function.

Figure 6:
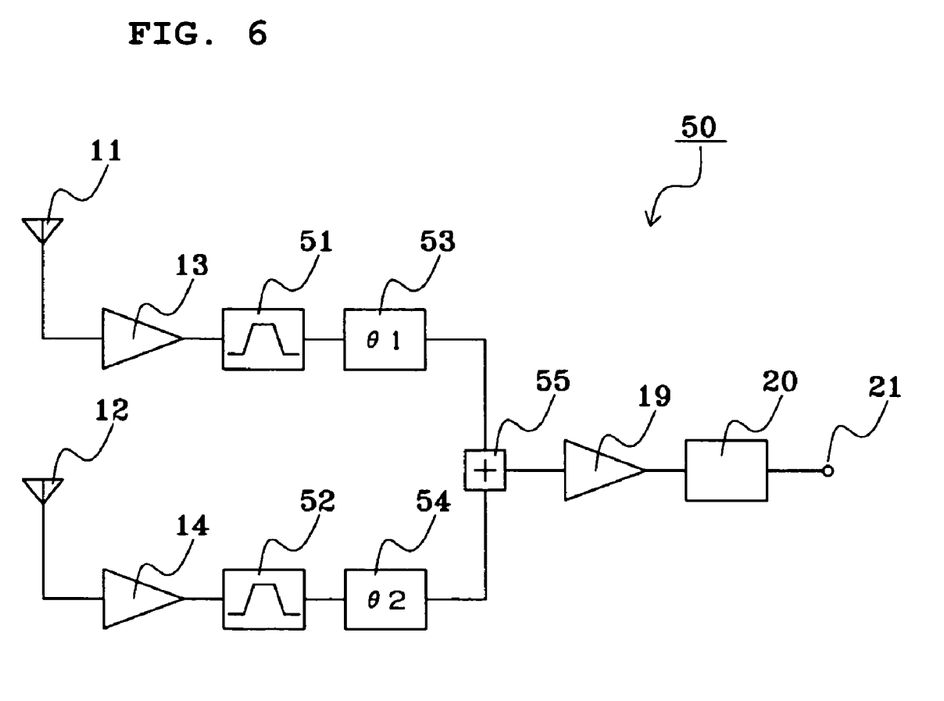
FIG. 6 is a block diagram of a radio receiving apparatus according to a fourth preferred embodiment of the present invention.

The first through third preferred embodiments described above each assume that the single SAW filter functioning as the band-pass filters, the delay circuits having delay times different from each other, and the combiner circuit for combining the outputs from the delay circuits is used. However, such a multi-purpose SAW filter is not essential in order to realize a radio receiving apparatus according to preferred embodiments of the present invention. FIG. 6 is a block diagram showing a radio receiving apparatus according to a fourth preferred embodiment of the present invention, that is, a radio receiving apparatus that does not use a multi-purpose SAW filter. The reference numerals and symbols in FIG. 6 refer to the same components as those with the same reference numerals and symbols in FIG. 1, and repeated descriptions of the same components are omitted.

A radio receiving apparatus 50 shown in FIG. 6 differs from the radio receiving apparatus 10 shown in FIG. 1 only in that the radio receiving apparatus 50 includes band-pass filters 51 and 52, delay circuits 53 and 54, and a signal combiner circuit 55 in place of the SAW filter 15. The output from the RF amplifier 13 is connected to one end of the signal combiner circuit 55 via the band-pass filter 51 and the delay circuit 53 in that order, and the output from the RF amplifier 14 is connected to the other end of the signal combiner circuit 55 via the band-pass filter 52 and the delay circuit 54 in that order. The output from the signal combiner circuit 55 is connected to the RF amplifier 19. The delay circuits 53 and 54 described above may be formed of a strip line as a delay line or a single SAW delay line. The signal combiner circuit 55 described above may be formed of a wired-OR circuit, for example.

Without a SAW filter, the radio receiving apparatus 50 constructed as described above can offer the same advantages as with the radio receiving apparatuses 10, 30, and 40, i.e., it can improve the likelihood of a signal being received successfully by splitting one signal into two signal components which are phase-shifted from each other.

The foregoing radio receiving apparatuses 10, 30, and 40 assume that a burst signal is transmitted several times. It is noted that these radio receiving apparatuses 10, 30, and 40 can perform their intended functions even when such a burst signal is transmitted only once. Even in this case, the two signal components sa1 and sb1, as shown in FIG. 2, enter the detector circuit 20, and therefore the radio receiving apparatuses according to preferred embodiments of the present invention can secure a signal component (sb1) for reception in addition to the minimum required signal component (sa1).

Although two or three antennas are preferably used and hence two or four signals are combined in the foregoing preferred embodiments, three, five, or more antennas may be used and the same number of signals may be combined.

The present invention is not limited to each of the above-described preferred embodiments, and various modifications are possible within the range described in the claims. An embodiment obtained by appropriately combining technical features disclosed in each of the different preferred embodiments is included in the technical scope of the present invention.

What is claimed is:

1. A radio receiving apparatus comprising:
   a plurality of antennas;
   a plurality of delay circuits which are respectively connected to the plurality of antennas and have delay times that are different from one another;
   a combiner circuit for combining reception signals output from the delay circuits such that the reception signals do not overlap one another in a time domain; and
   a detector circuit for sequentially detecting the reception signals output from the combiner circuit.

2. The radio receiving apparatus according to claim 1, wherein a signal received by the plurality of antennas is a burst signal having a constant duration and the delay times of the delay circuits differ from one another by at least the duration of the burst signal.

3. The radio receiving apparatus according to claim 2, wherein the burst signal is repeated at a constant interval and the delay time of a delay circuit having the largest delay time is smaller than the constant interval.

4. The radio receiving apparatus according to claim 1, further comprising a frequency converter circuit located between each of the plurality of antennas and the corresponding delay circuit.

5. The radio receiving apparatus according to claim 1, further comprising a band-pass filter connected in series to each of the delay circuits.

6. The radio receiving apparatus according to claim 5, wherein the delay circuits, the band-pass filters, and the combiner circuit constitute a surface acoustic wave device which includes a plurality of input IDTs connected to the respective antennas and an output IDT for receiving signals from the input IDTs such that the distances from the center of the output IDT to the centers of the input IDTs differ from one another.

7. The radio receiving apparatus according to claim 6, wherein the surface acoustic wave device includes at least three interdigital transducers arranged such that a first band-pass filter is defined between a first and a second of the interdigital transducers and a second band-pass filter is defined between the second and a third of the interdigital transducers.

8. The radio receiving apparatus according to claim 7, the first and second band-pass filters have different delay times.

9. The radio receiving apparatus according to claim 7, wherein two of the antennas are provided.

10. The radio receiving apparatus according to claim 6, wherein the surface acoustic wave device includes at least five interdigital transducers arranged such that a first band-pass filter is defined between a first and a second of the interdigital transducers and a second band-pass filter is defined between the second and a third of the interdigital transducers.

11. The radio receiving apparatus according to claim 10, the first and second band-pass filters have different delay times.

12. The radio receiving apparatus according to claim 10, wherein four of the antennas are provided.

13. The radio receiving apparatus according to claim 1, wherein the radio receiving apparatus is a remote keyless entry receiver.

14. The radio receiving apparatus according to claim 1, further comprising at least one mixer for converting an RF signal to an IF signal for inputting to the detector circuit.

15. The radio receiving apparatus according to claim 1, wherein the delay circuits include strip lines and the combiner circuit includes a wired-OR circuit.

16. A radio receiving apparatus comprising:
   a plurality of antennas; and
   a surface acoustic wave device including:
      a plurality of delay circuits which are respectively connected to the plurality of antennas and have delay times that are different from one another;
      a combiner circuit for combining reception signals output from the delay circuits such that the reception signals do not overlap one another in a time domain; and
      a detector circuit for sequentially detecting the reception signals output from the combiner circuit.

17. The radio receiving apparatus according to claim 16, wherein a signal received by the plurality of antennas is a burst signal having a constant duration and the delay times of the delay circuits differ from one another by at least the duration of the burst signal.

18. The radio receiving apparatus according to claim 17, wherein the burst signal is repeated at a constant interval and the delay time of a delay circuit having the largest delay time is smaller than the constant interval.

19. The radio receiving apparatus according to claim 16, further comprising a frequency converter circuit located between each of the plurality of antennas and the corresponding delay circuit.

20. The radio receiving apparatus according to claim 16, further comprising a band-pass filter connected in series to each of the delay circuits.

21. The radio receiving apparatus according to claim 20, wherein the band-pass filters are constituted by the surface acoustic wave device.

22. The radio receiving apparatus according to claim 16, wherein the surface acoustic wave device includes a plurality of input IDTs connected to the respective antennas and an output IDT for receiving signals from the input IDTs such that the distances from the center of the output IDT to the centers of the input IDTs differ from one another.

23. The radio receiving apparatus according to claim 16, wherein the radio receiving apparatus is a remote keyless entry receiver.

24. The radio receiving apparatus according to claim 16, wherein the surface acoustic wave device includes at least three interdigital transducers arranged such that a first band-pass filter is defined between a first and a second of the interdigital transducers and a second band-pass filter is defined between the second and a third of the interdigital transducers.

25. The radio receiving apparatus according to claim 16, wherein the surface acoustic wave device includes at least five interdigital transducers arranged such that a first band-pass filter is defined between a first and a second of the interdigital transducers and a second band-pass filter is defined between the second and a third of the interdigital transducers.

* * * * *